United States Patent
Shtendel et al.

(10) Patent No.: US 12,556,300 B2
(45) Date of Patent: Feb. 17, 2026

(54) SYSTEMS, DEVICES AND METHODS FOR DETECTION AND/OR PREVENTION OF POWER LINE COMMUNICATION

(71) Applicant: S.G.A. INNOVATIONS LTD., Beer Sheva (IL)

(72) Inventors: Yuval Shtendel, Lehavim (IL); Shmuel Gal, Kibbutz Bet Kama (IL); Alexey Tsirlin, Beer Sheva (IL)

(73) Assignee: S.G.A. INNOVATIONS LTD., Beer Sheva (IL)

( * ) Notice: Subject to any disclaimer, the term of this patent is extended or adjusted under 35 U.S.C. 154(b) by 0 days.

(21) Appl. No.: 18/418,527

(22) Filed: Jan. 22, 2024

(65) Prior Publication Data
US 2024/0171299 A1    May 23, 2024

Related U.S. Application Data

(63) Continuation of application No. 17/415,265, filed as application No. PCT/IL2019/051373 on Dec. 16, 2019, now abandoned.

(30) Foreign Application Priority Data

Dec. 24, 2018 (IL) .......................... 263929

(51) Int. Cl.
*H04K 3/00* (2006.01)
*H04B 3/56* (2006.01)

(52) U.S. Cl.
CPC ............. *H04K 3/45* (2013.01); *H04B 3/56* (2013.01); *H04K 3/68* (2013.01); *H04B 2203/5491* (2013.01)

(58) Field of Classification Search
CPC ............. H04B 3/56; H04B 2203/5483; H04B 2203/5491; H04K 3/45; H04K 3/42; H04K 3/825
See application file for complete search history.

(56) References Cited

U.S. PATENT DOCUMENTS

| | | | |
|---|---|---|---|
| 2002/0060624 A1 | 5/2002 | Zhang | |
| 2002/0063474 A1* | 5/2002 | Wasaki | H03H 7/427 307/89 |
| 2002/0130768 A1 | 9/2002 | Che et al. | |
| 2003/0056070 A1 | 3/2003 | Dayan et al. | |

(Continued)

FOREIGN PATENT DOCUMENTS

| | | |
|---|---|---|
| CN | 103856242 A | 6/2014 |
| JP | 2004222111 A | 8/2004 |

(Continued)

OTHER PUBLICATIONS

PCT International Search Report for International Application No. PCT/IL2019/051373, mailed Mar. 8, 2020, 3pp.

(Continued)

*Primary Examiner* — Aristocratis Fotakis
(74) *Attorney, Agent, or Firm* — The Roy Gross Law Firm, LLC; Roy D. Gross

(57) ABSTRACT

There are provided systems, devices and methods for detection and/or prevention of power line communications. In particular, there are provided systems, devices, and methods for preventing and/or detecting the possibility to communicate with an end unit via power line communication.

20 Claims, 12 Drawing Sheets

(56) References Cited

U.S. PATENT DOCUMENTS

| | | |
|---|---|---|
| 2003/0056970 A1 | 3/2003 | Young |
| 2005/0007241 A1* | 1/2005 | Kline ................... H04B 3/54 370/464 |
| 2008/0266025 A1* | 10/2008 | Blasco Claret ........ H04B 3/542 333/181 |
| 2009/0072954 A1 | 3/2009 | Kim et al. |
| 2010/0204850 A1* | 8/2010 | Henderieckx ............ H04B 3/56 700/297 |
| 2011/0026621 A1 | 2/2011 | Kim et al. |
| 2012/0093198 A1 | 4/2012 | Dabak et al. |
| 2012/0126612 A1* | 5/2012 | Hurwitz ................... H04B 3/54 307/3 |
| 2012/0195355 A1 | 8/2012 | El-Essawy et al. |
| 2012/0300820 A1* | 11/2012 | Eitel ....................... H04B 3/54 375/257 |
| 2013/0003696 A1* | 1/2013 | Bennett .................. H04L 25/02 370/331 |
| 2013/0003876 A1 | 1/2013 | Bennett |
| 2013/0156116 A1* | 6/2013 | Sim ........................ H04B 3/54 375/257 |
| 2013/0335105 A1 | 12/2013 | Washiro |
| 2014/0088784 A1* | 3/2014 | Washiro ................ G06Q 30/04 700/295 |
| 2014/0205026 A1 | 7/2014 | Smaini et al. |
| 2014/0269868 A1* | 9/2014 | Werner ................... H04B 3/54 375/224 |
| 2014/0269952 A1* | 9/2014 | Katar ....................... H04B 3/56 375/257 |
| 2014/0355610 A1* | 12/2014 | Ge .......................... H04L 45/74 370/392 |
| 2015/0092545 A1* | 4/2015 | Katar ................... H04L 1/0078 370/230 |
| 2015/0357866 A1 | 12/2015 | Kolsky et al. |

FOREIGN PATENT DOCUMENTS

| | | |
|---|---|---|
| JP | 2007174461 A | 7/2007 |
| JP | 4692271 B2 | 6/2011 |
| JP | 2012104867 A | 5/2012 |
| JP | 2012032202 A | 5/2015 |
| WO | 2019186184 A1 | 10/2019 |

OTHER PUBLICATIONS

PCT Written Opinion for International Application No. PCT/IL2019/051373, mailed Mar. 8, 2020, 6pp.

* cited by examiner

SYSTEMS, DEVICES AND METHODS FOR DETECTION AND/OR PREVENTION OF POWER LINE COMMUNICATION

CROSS REFERENCE TO RELATED APPLICATIONS

This application is a continuation of U.S. Ser. No. 17/415,265 filed Jun. 17, 2021, which is a National Phase of PCT Patent Application No. PCT/IL2019/051373 having International filing date of Dec. 16, 2019, entitled "SYSTEMS, DEVICES AND METHODS FOR DETECTION AND/OR PREVENTION OF POWER LINE COMMUNICATION", which claims the benefit of priority of Israel Patent Application No. IL 263929, filed on Dec. 24, 2018. The contents of the above applications are all incorporated by reference as if fully set forth herein in their entirety.

FIELD OF THE INVENTION

This invention relates to the field of Power Line Communication (PLC), more specifically, to systems, devices and methods for interfering and preventing and/or detecting the possibility to communicate with an end unit via PLC.

BACKGROUND OF THE INVENTION

Currently, the most popular method to prevent the possibility to communicate with an end unit via PLC is by using a PLC filter. One of the disadvantages of this method is the existence of parasitic and alternative paths or lack of sufficient attenuation, which enables communication despite the filter. Another method is using a noise source that injects noise to the line. One of the disadvantages of this method is the fact that some modems can overcome high noise levels to enable such communication despite the noise. Additional method is to detect and alert about the presence of PLC signal. One of the disadvantages of this method is its lack of capability to maintain a low miss-detect and false alarm levels (especially when the signal is weak, and/or the signal to noise ratio (SNR) is low). None of the above elements provide a high level of communication prevention and/or detection, even when using high end elements, let alone when using basic elements.

There is thus a need in the art for compact and cost effective systems, devices and methods that can provide a high level of power line communication prevention and/or detection.

SUMMARY OF THE INVENTION

The present invention, in embodiments thereof, provides systems, devices and methods that allow a very high level and efficient, power line communication prevention and/or detection, at a cost-effective manner, while maintaining a small form factor. In some embodiments, the compact and cost effective systems and devices disclosed herein, as well as the methods utilized can provide a versatile high level of power line communication prevention and/or detection, such that, advantageously, even if the communication is not detected it can be prevented, and even if it is not prevented it can be detected, and moreover, in some cases the communication can be both detected and prevented. In some embodiments, there are provided devices and methods for PLC signal filtering. In some embodiments, there are provided devices and methods for PLC noise generation. In some embodiments, there are provided devices and methods for detection of PLC signal. According to some embodiments, there are provided systems and devices that may include: PLC signal filters and/or PLC noise generator and/or PLC signal detector. According to some embodiments, there are provided methods that may include: PLC signal filtering and/or PLC noise generating and/or PLC signal detecting. In some embodiments, the combination of various elements in the disclosed devices and methods provides a powerful, state of the art power line communication prevention and/or detection, where each element covers, masks or complements disadvantages of other elements.

In some embodiments, there is provided a device for prevention and/or detection of power line communication (PLC) between an unprotected side and a protected side, the device may include a PLC signal detector, a power supply and at least one PLC filter. According to some embodiments the device may further include a PLC noise generator.

In some embodiments, the frequency range of the PLC signal detector is about 3 KHz-100 MHz. According to some embodiments, the frequency range of the PLC signal detector is about 40 KHz-30 MHz.

According to some embodiments, the PLC signal detector may be a dual port detector. According to some embodiments, the detection method of each port may be different. According to some embodiments, the sensitivity level of the detection at each port may be different.

In some embodiments, the frequency range of the PLC filter may be about 3 KHz-100 MHz. According to some embodiments, the frequency range of the PLC filter may be about 40 KHz-30 MHz. According to some embodiments, the structure of the filter at the unprotected side may be different than the structure of the filter at the protected side. According to some embodiments, the attenuation level of the filter at the unprotected side may be different than the attenuation level of the filter at the protected side. In some embodiments, the device may include at least two filters. In some embodiments, the device may include a first filter at the unprotected side of the device and a second filter at the protected side of the device. In some embodiments, the structure of the first filter at the unprotected side may be different than the structure of the second filter at the protected side. In some embodiments, the attenuation level of the first filter at the unprotected side may be different than the attenuation level of the second filter at the protected side.

In some embodiments, the frequency range of the PLC noise generator may be about 3 KHz-100 MHz. According to some embodiments, the frequency range of the PLC noise generator may be about 40 KHz-30 MHz. According to some embodiments, the noise generator may be a dual port noise generator.

In some embodiments, the power supply provides a zero-cross indication. According to some embodiments, the power supply may further include a backup rechargeable battery.

In some embodiments, there is provided a method for preventing and/or detecting of power line communication (PLC), the method may include detecting PLC and filtering PLC. According to some embodiments, the method may further include a step of PLC noise generating.

In some embodiments, the PLC detecting may be performed by Received Signal Strength Indication (RSSI), cross correlation, pattern recognition, neural networks, or any combination thereof. According to some embodiments, the detection method of each port may be different. According to some embodiments, the detection parameters settings of each port may be different.

In some embodiments, the PLC detecting may include detecting at two ports, a first port at the protected side and a second port at the unprotected side. In some embodiments, the PLC detection method of each of the first port and the second port may be different. In some embodiments, the PLC detection parameters settings of the first port and the second port may be different.

In some embodiments, the PLC filtering may be performed by attenuation and/or blocking.

In some embodiments, the PLC noise generating type may be selected from: Additive White Gaussian Noise (AWGN), frequency hopping noise, random noise, or any combination thereof. According to some embodiments, the noise may be generated at more than one port. In some embodiments, the type of the generated noise at each of said one or more ports may be different. According to some embodiments, the type of the generated noise at each port may be different.

In some embodiments, there is provided a system for prevention and/or detection of power line communication (PLC), the system may include an end unit and a device for prevention and/or detection of power line communication (PLC), said device may include a PLC detector, and at least one PLC filter. According to some embodiments, the device may further include a PLC noise generator. According to some embodiments, the system may have a protected side and an unprotected side.

According to some embodiments, the end unit may be selected from an electronic appliance, a personal computer, a printer, a scanner, or any unit connected to the mains. According to some embodiments, the device may be embedded in the wall's outlets. According to some embodiments, the device may be a stand-alone device connected to shielded or unshielded cables. According to some embodiments, the casing/housing of the device may be shielded or unshielded. According to some embodiments, the casing of the device may be made of metal and/or plastic.

In addition to exemplary aspects and embodiments described above, further aspects and embodiments will become apparent by reference to the figures and by study of the following detailed description.

BRIEF DESCRIPTION OF THE DRAWING

Exemplary embodiments are illustrated in referenced figures. Dimensions of components and features shown in the figures are generally chosen for convenience and clarity of presentation and are not necessarily shown to scale The figures are listed below.

DETAILED DESCRIPTION OF THE INVENTION

The present invention, in embodiments, thereof, provides systems, devices and methods, for prevention and/or detection of the possibility to communicate (for example, by means of transferring digital data, audio, video, and the like), with an end unit connected to a protected side via power line communication, to thereby create a protected environment.

The present invention, in embodiments, thereof, provides systems, devices and methods that offer a very high level, power line communication prevention and/or detection, at an efficient, cost-effective and compact implementation.

Figure 1:
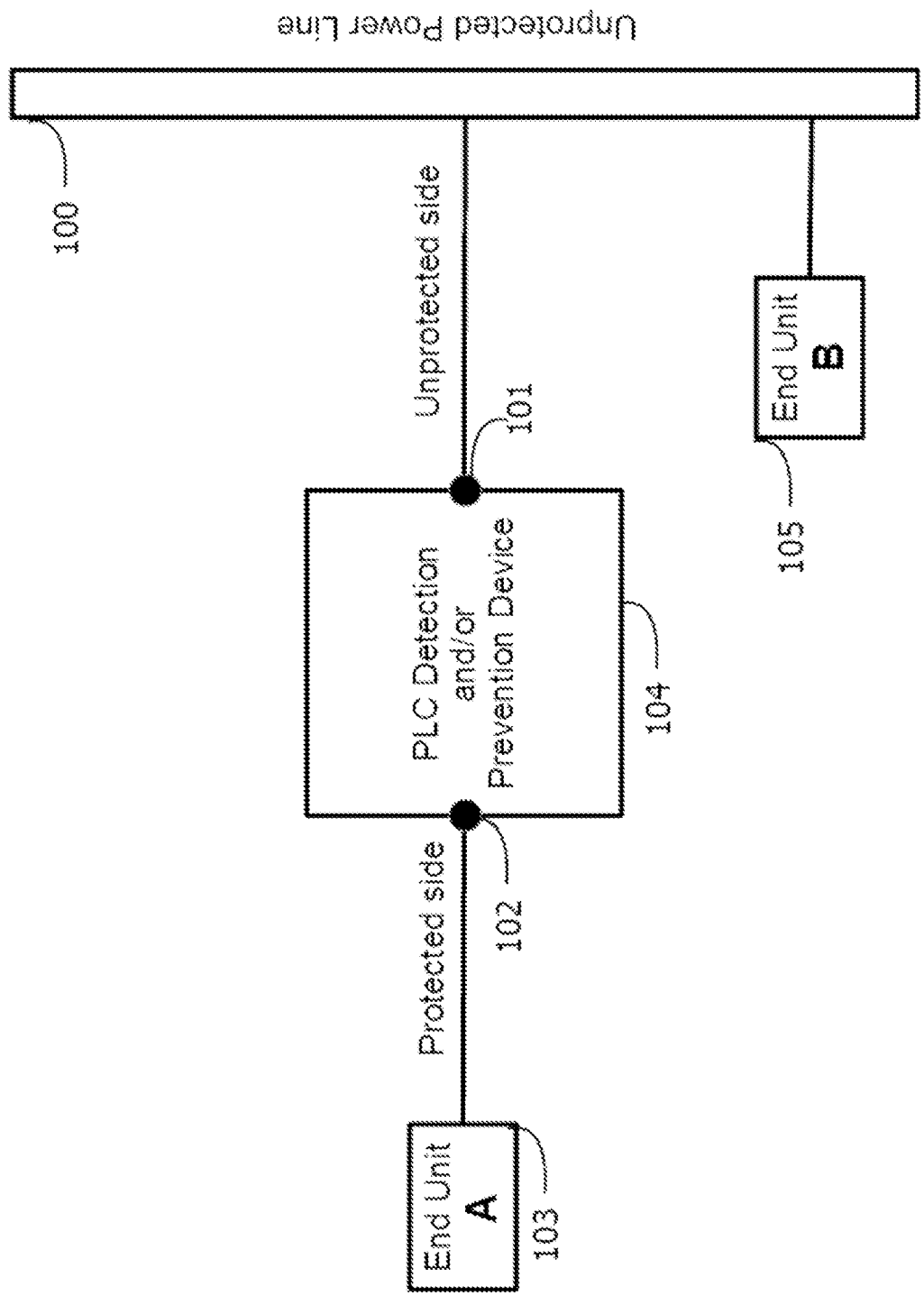
FIG. 1. A general scheme of power line communication prevention and/or detection, according to some embodiments.

Reference is made to FIG. 1, which illustrates a general scheme of power line communication prevention and/or detection, according to some embodiments. As shown in FIG. 1, device (104) prevents and/or detects the possibility to communicate over power line, between end unit A (103), connected to a protected side (102) of device for power line communication prevention and/or detection (device 104), and end unit B (105), connected to an unprotected power line (100), at an unprotected side (101) of the device (104).

Figure 2A:
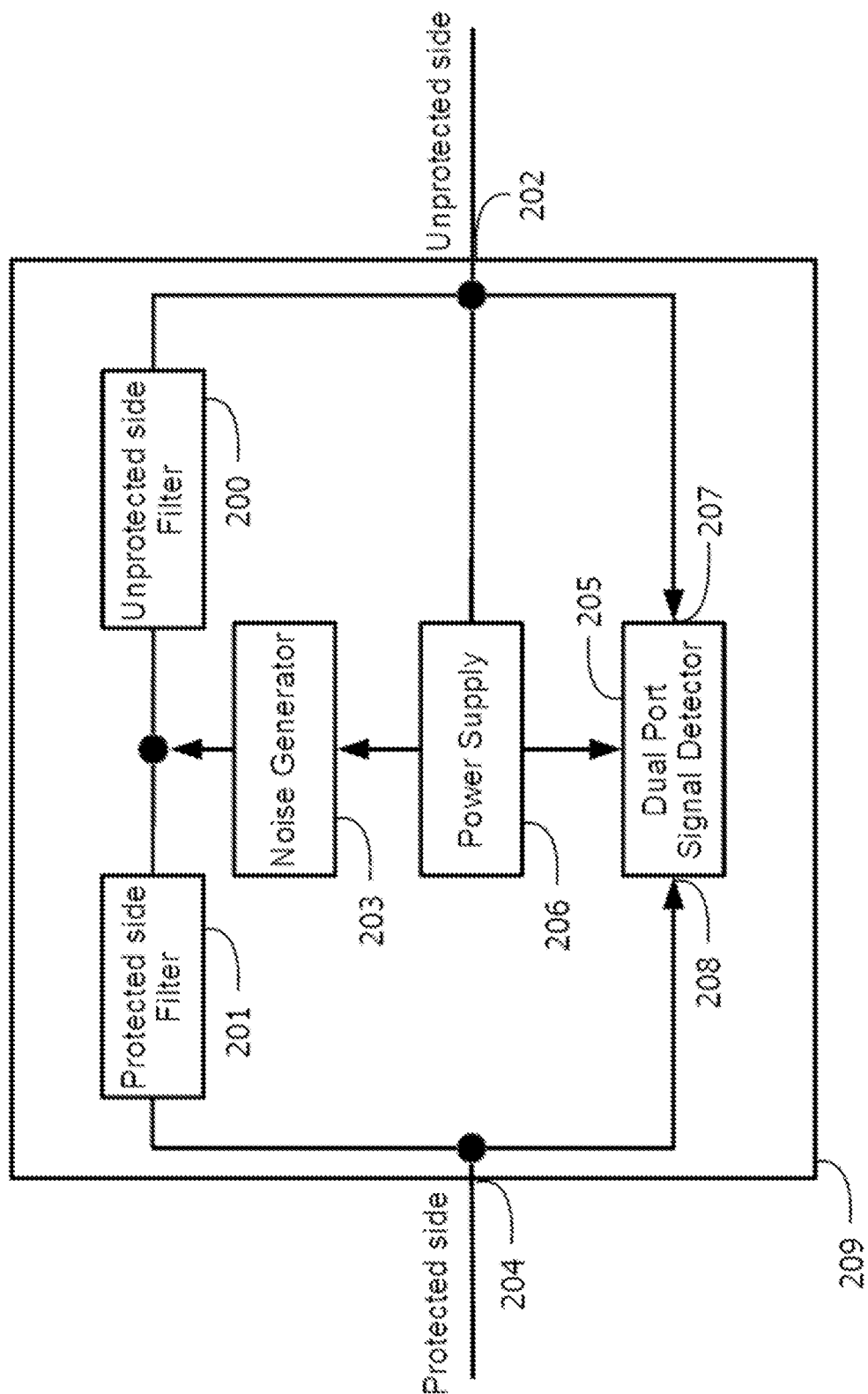
FIG. 2A. A block diagram of a device for power line communication prevention and/or detection, according to some embodiments.
Figure 2B:
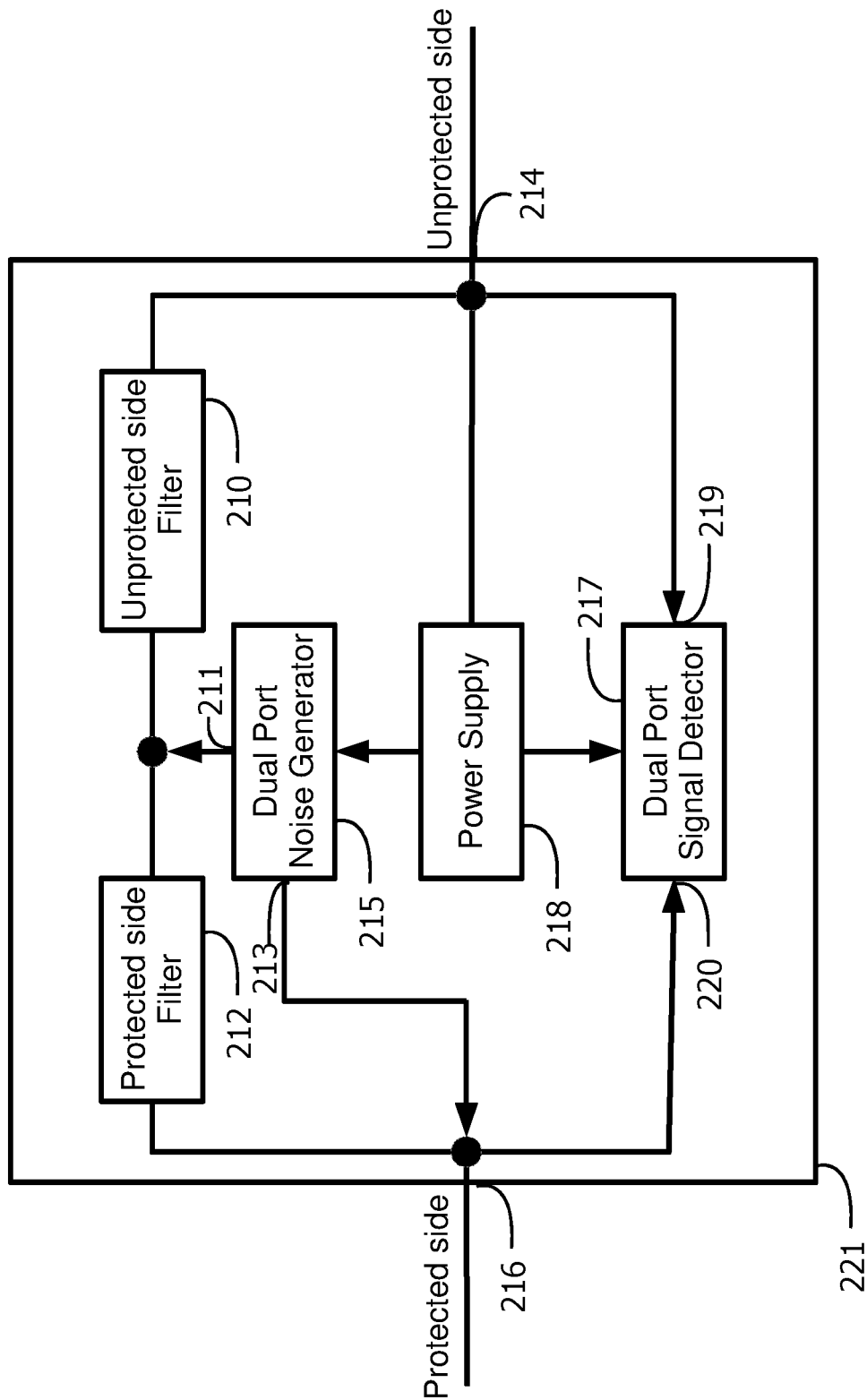
FIG. 2B. A block diagram of a device for power line communication prevention and/or detection, according to some embodiments.

Reference is made to FIG. 2A, which illustrates a block diagram of a device for power line communication prevention and/or detection, according to some embodiments. As shown in FIG. 2A, a device (209) has a protected side (204) and an unprotected side (202). The device includes a dual port PLC signal detector (205), (one port (207) of the dual port PLC signal detector is connected to the unprotected side of the device (202) and the other port (208) is connected to the protected side of the device (204)). The device also includes PLC filters (shown as unprotected side filter (200) and protected side filter (201)) and PLC noise generator (203) and power supply (206). According to some embodiments the PLC noise generator (203) shown in FIG. 2A, can be replaced with a dual port noise generator (215), as shown in FIG. 2B, which illustrates a block diagram of a device for power line communication prevention and/or detection, according to some embodiments.

Figure 3A:
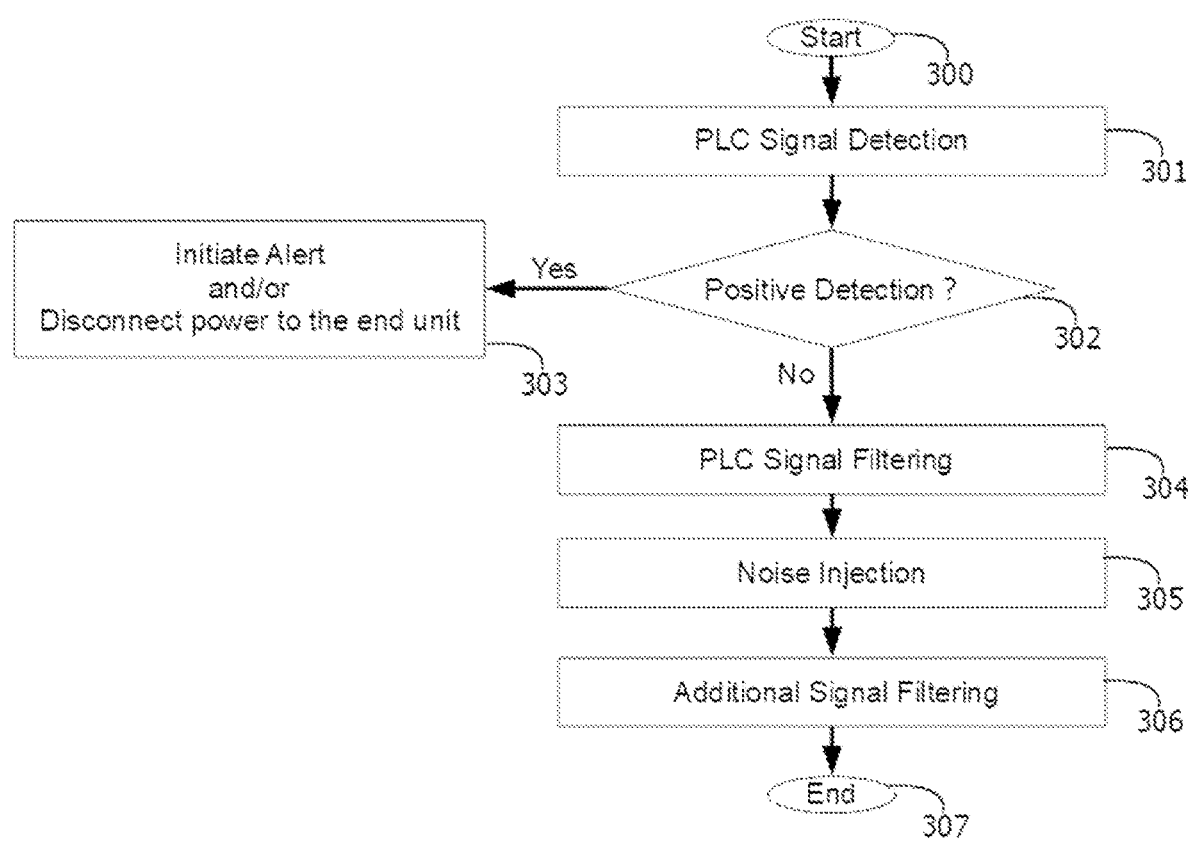
FIG. 3A. A flow chart of a method for detecting and/or preventing power line communication, from an unprotected side to a protected side, and vice versa, according to some embodiments.

Reference is made to FIG. 3A, which illustrates a flow chart of a method for detecting and/or preventing power line communication, from an unprotected side to a protected side, and vice versa, according to some embodiments. At the start point (step 300), a signal coming/arriving from an unprotected side enters the device for power line communication prevention and/or detection. The signal is being detected (at steps 301, 302) by a dual port signal detector. At this point, if a PLC signal is detected by the signal detector, the device may initiate alert and/or disconnect the power (step 303) to an end unit connected to the protected side. At the next step (304), the signal is attenuated by the unprotected side filter. After the signal was attenuated, a noise, from a noise generator, is added to the line (step 305), the sum of the noise and the attenuated signal creates very low signal to noise (SNR) conditions. The signal is further attenuated (step 306), by the protected side filter, so that at the end (step 307), the signal level and SNR conditions at the protected side are too low and communication over power line is not possible.

Figure 3B:
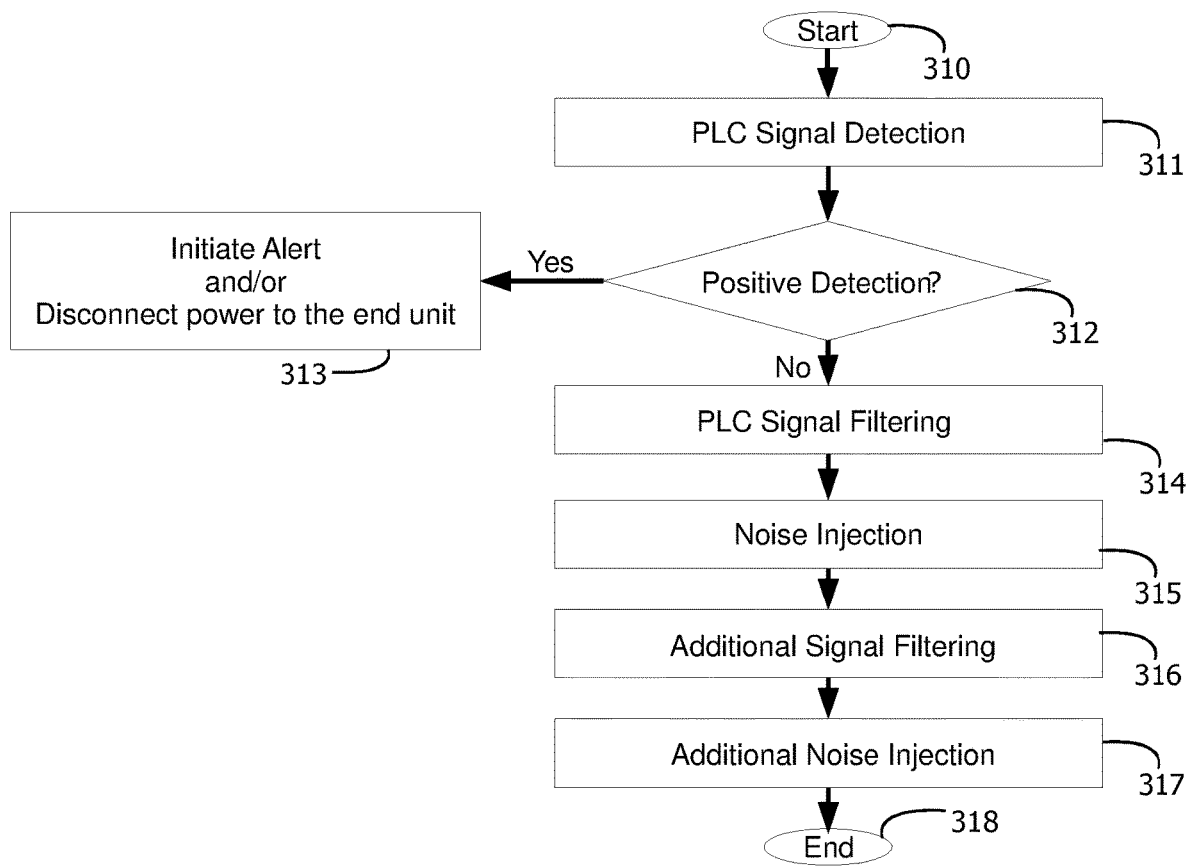
FIG. 3B. A flow chart of a method for detecting and/or preventing power line communication, from an unprotected side to a protected side, according to some embodiments.

According to some embodiments, as shown in FIG. 3B, which is a flow chart of a method for detecting and/or preventing power line communication, from an unprotected side to a protected side, an additional step (318) is added before the end (319) wherein a noise from the dual port noise generator is added to the line to protect against communication over power line via parasitic paths.

According to some embodiments, the methods disclosed herein can be used to prevent and/or detect power line communication from an unprotected side to a protected side and vice versa. In some embodiments, there could be variations in configuration and operating parameters between various device's elements connected to the unprotected side and device's elements connected to the protected side, according to the expected environmental condition on each side. For example, the background noise at the protected side is expected to be much lower and more stable than the background noise at the unprotected side (as the unprotected side is directly exposed to the entire electric network, while the protected side is directly exposed only to the end unit connected to it), as a result the signal detector connected to the protected side can be more sensitive to detect lower PLC signal than the detector at the unprotected side, without inducing false alarms. Having a more sensitive detector enables to reduce the size and attenuation value of the filter connected to the protected side (compared to the filter on the unprotected side), while maintaining a high level of communication prevention. In addition, as the attenuation of the filter connected to the protected side is reduced, the PLC noise (coming from the noise generator) at the protected side is higher which helps to cope better with signal coming from the unprotected side to the protected side, not through the main route.

In some embodiments, the topology structure of the device and the methods disclosed herein, enable the use of rather basic elements of PLC filter, PLC detector and PLC noise generator while creating a very powerful, efficient, cost-effective and compact power line communication prevention and/or alert device, as each element can overcome disadvantages of other elements.

Figure 4:
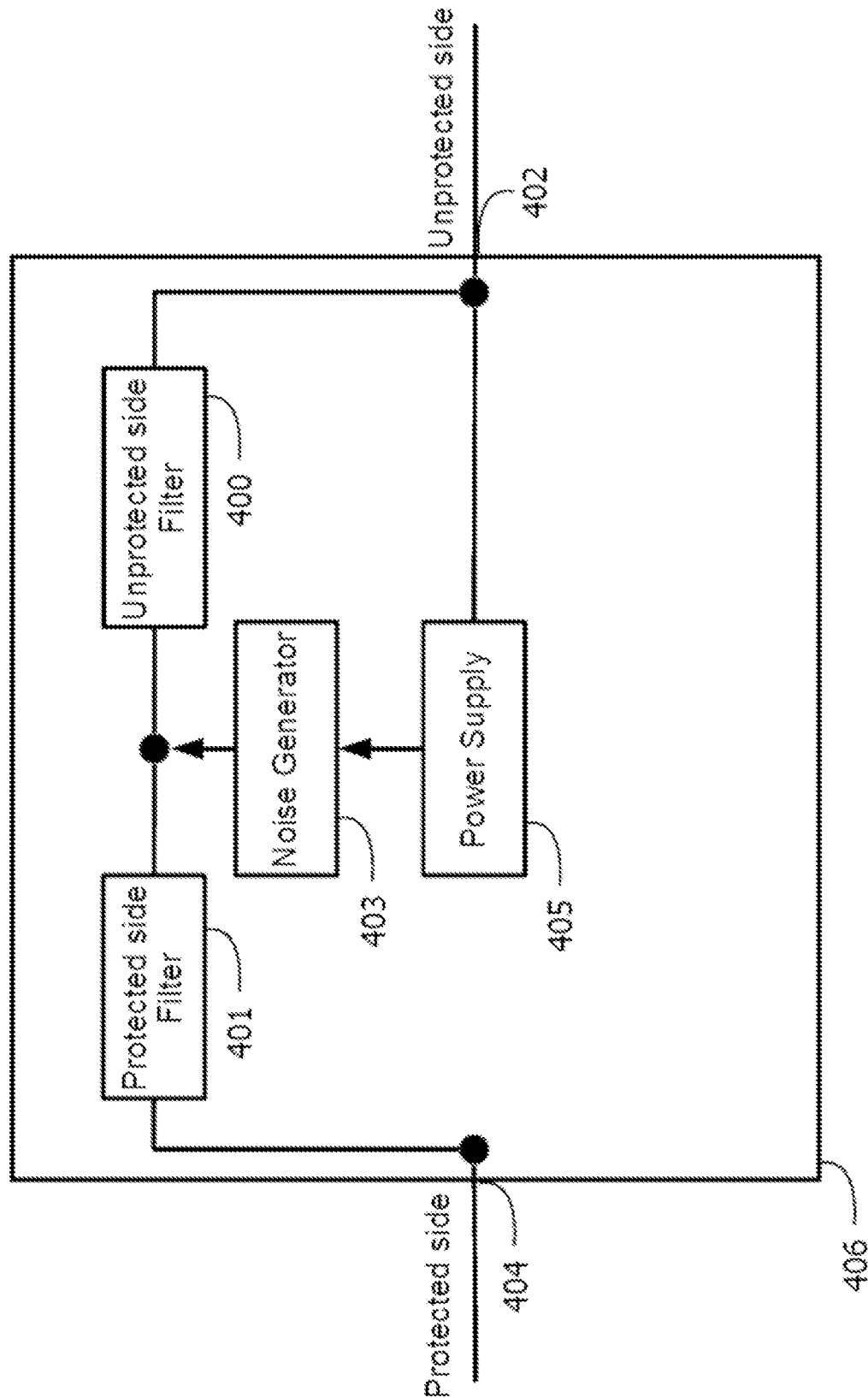
FIG. 4. A block diagram of a device for power line communication prevention, according to some embodiments.

Reference is made to FIG. 4, which illustrates a block diagram of a device for power line communication prevention, according to some embodiments. As shown in FIG. 4, device (406) has a protected side (204) and an unprotected side (202), the device includes PLC filters (shown as unprotected side filter (400) and protected side filter (401)), PLC noise generator (403) and power supply (405).

Figure 5:
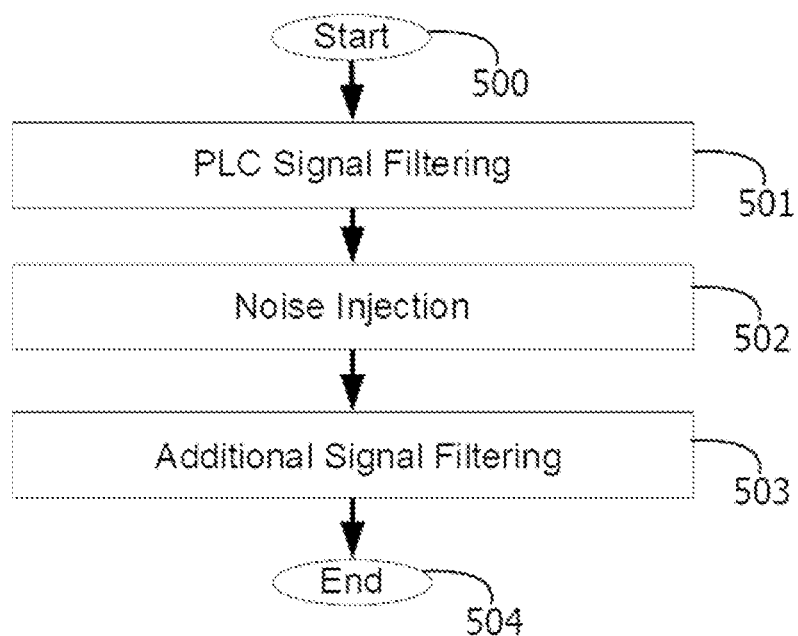
FIG. 5. A flow chart of a method for preventing power line communication, from an unprotected side to a protected side, and vice versa, according to some embodiments.

Reference is made to FIG. 5, which is a flow chart of a method for preventing power line communication, from an unprotected side to a protected side, and vice versa, utilizing the device illustrated in FIG. 4, according to some embodiments. At the start point (step 500), a signal coming from an unprotected side enters to a device for power line communication prevention. At the next step (501), the signal is attenuated by the unprotected side filter. After the signal was attenuated, a noise, from a noise generator, is added to the line (step 502), whereby the sum of the noise and the attenuated signal creates very low SNR conditions. The signal is further attenuated (step 503), by the protected side filter, so that at the end (504), the signal level and SNR conditions at the protected side are low, and communication over power line is not possible.

Figure 6:
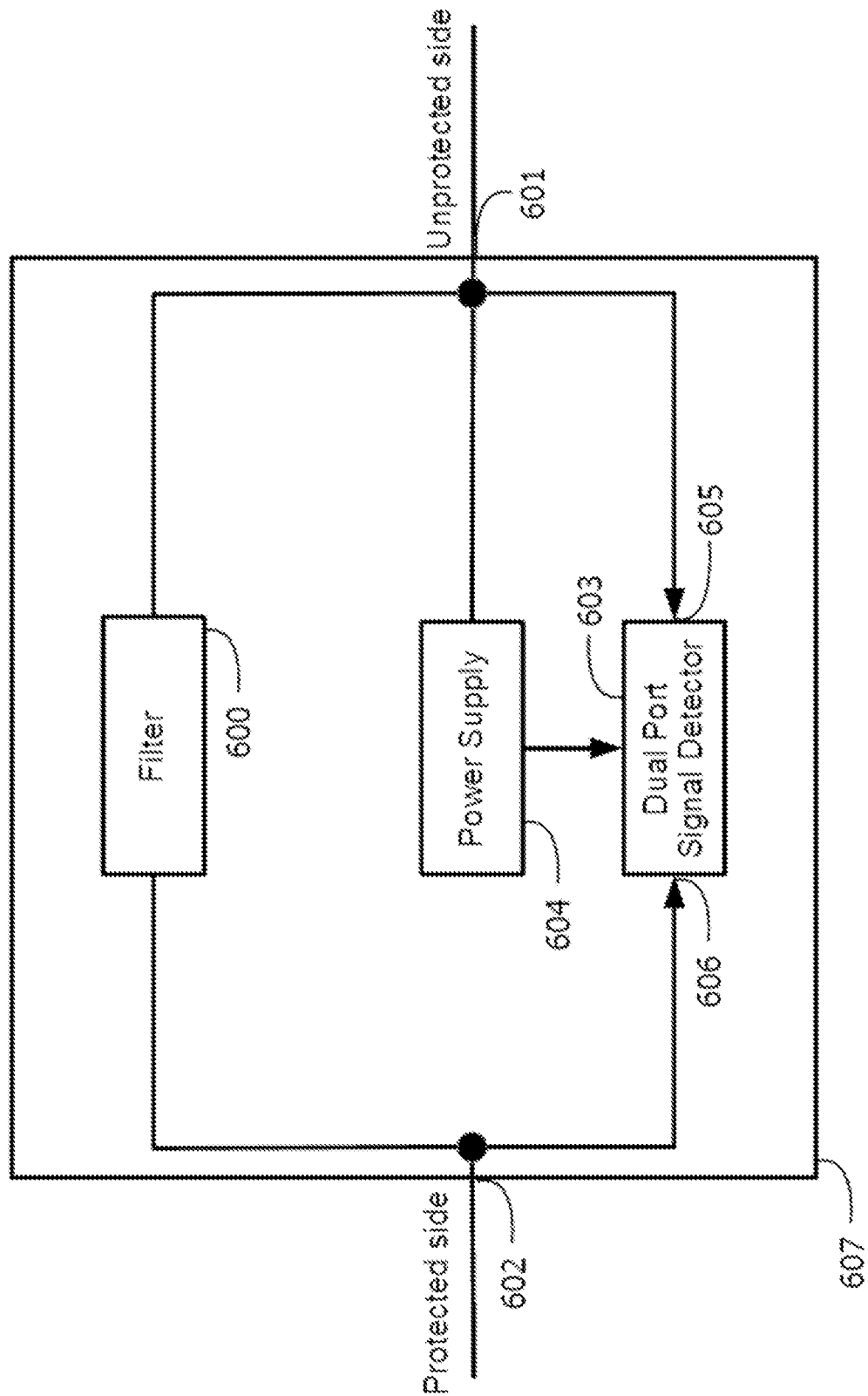
FIG. 6. A block diagram of a device for power line communication prevention, and/or detection, according to some embodiments.

Reference is made to FIG. 6, which illustrates a block diagram of a device for power line communication prevention, and/or detection, according to some embodiments. As shown in FIG. 6, a device (607) has a protected side (602) and an unprotected side (601), the device includes a dual port PLC signal detector (603), (one port (605) of the dual port PLC signal detector is connected to the unprotected side of the device (601) and the other port (606) is connected to the protected side of the device (602)), PLC filter (600) and power supply (604).

Figure 7:
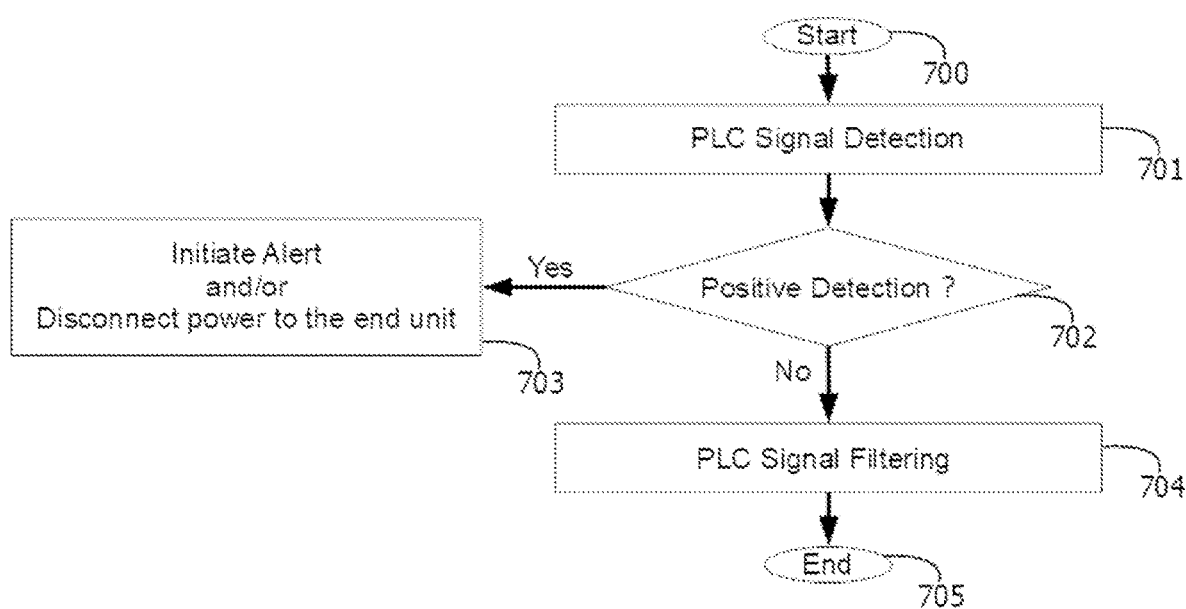
FIG. 7. A flow chart of a method for detecting and/or preventing power line communication, from an unprotected side to a protected side, and vice versa, according to some embodiments.

Reference is made to FIG. 7, which is a flow chart of a method for detecting and/or preventing power line communication, from an unprotected side to a protected side, and vice versa, utilizing the device described in FIG. 6, according to some embodiments. At the start point (step 700), a signal coming from an unprotected side enters to a device for power line communication prevention and/or detection. The signal is being detected (at steps 701, 702), by a dual port signal detector. At this point, if a PLC signal is detected by the signal detector, the device may initiate alert and/or disconnect the power (step 703) to an end unit connected to the protected side. At the next step (704), the signal is attenuated by a filter, and at the end (705), the signal level at the protected side is very low, and communication over power line is not possible.

In some embodiments, the PLC detector element of the device may be used for detecting the presence of a PLC signal on the mains. The detection can be for example, by means of Received Signal Strength Indication (RSSI), cross correlation, pattern recognition, neural networks, and the like, or any combination thereof. Each possibility is a separate embodiment. In some embodiments, the detector may be synchronized with the mains frequency by using the zero-cross indication. In some embodiments, the operating frequency range can be for example: between 3 KHz-100 MHz, between 9 KHz-500 KHz, between 2 MHz-100 MHz, between 40 KHz-30 MHz, or any other sub range thereof. Each possibility is a separate embodiment.

In some embodiments, the PLC detector element may have a dual port connection, where each port may have different detection method and may have different parameters settings, such as, but not limited to, sensitivity level, threshold, and the like, or any combination thereof.

In some embodiments, the PLC filter element of the device may be used to filter out PLC signals, for example, by means of attenuation, blocking, and the like. The operating frequency range can be for example: between 3 KHz-100 MHz, between 9 KHz-500 KHz, between 2 MHz-100 MHz, between 40 KHz-30 MHz, or any other sub range thereof. Each possibility is a separate embodiment.

In some embodiments, the device may include more than PLC filter, the filters may be identical, similar, or different with respect to size, structure, attenuation level, and the like, or any combination thereof.

In some embodiments, the PLC noise generator element of the device may be used to generate PLC noise, for example, by means of Additive White Gaussian Noise (AWGN), frequency hopping noise, random noise, and the like, or any combination thereof. In some embodiments, the noise may be synchronized with the mains frequency by using the zero-cross indication. In some embodiments, the operating frequency range can be for example: between 3 KHz-100 MHz, between 9 KHz-500 KHz, between 2 MHz-100 MHz, between 40 KHz-30 MHz, or any other sub range thereof. Each possibility is a separate embodiment.

In some embodiments, the power supply element of the device may be, for example AC/DC or DC/DC. In some embodiments, the power supply may be powered by a battery. In some embodiments, the power supply element may include an AC zero-cross indication. In some embodiments, the power supply element may include a backup power source, such as, for example a rechargeable battery.

Figure 8:
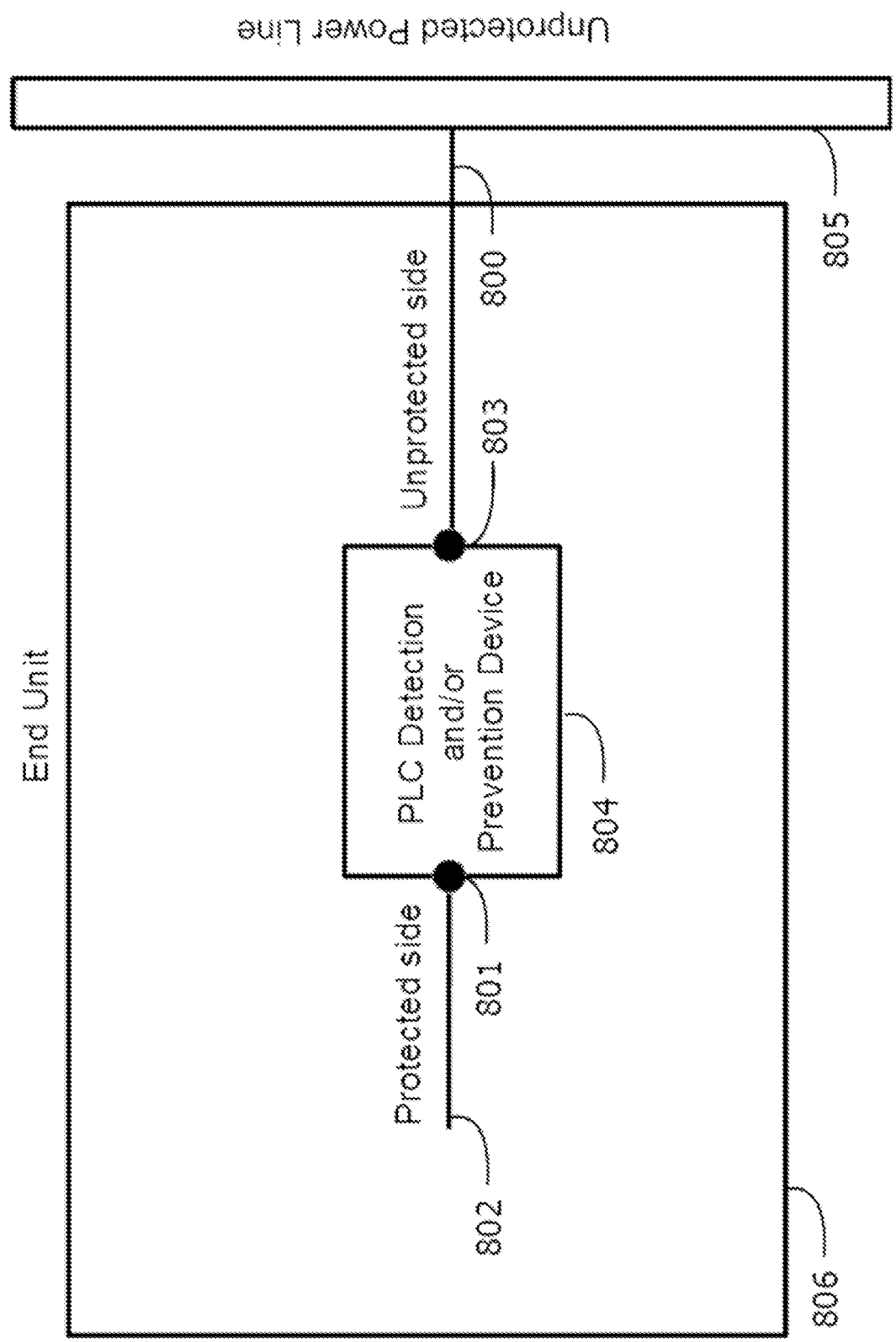
FIG. 8. A block diagram of a system for power line communication prevention, and/or detection, the system includes a device for prevention and/or detection of power line communication, embedded within an end unit, according to some embodiments.

Reference is made to FIG. 8, which illustrates a block diagram of a system for power line communication prevention, and/or detection, the system includes a device for prevention and/or detection of power line communication, embedded within an end unit, according to some embodiments. As shown in FIG. 8, a device for prevention and/or detection of power line communication (804), is embedded within an end unit (806). The unprotected side of the device (803) is connected to the unprotected power line (805) via the end unit's external connection to the mains (800) and the protected side of the device (801) is connected to the end unit's internal mains input (802). As a result, the end unit (806) is protected against communication over power line.

Figure 9:
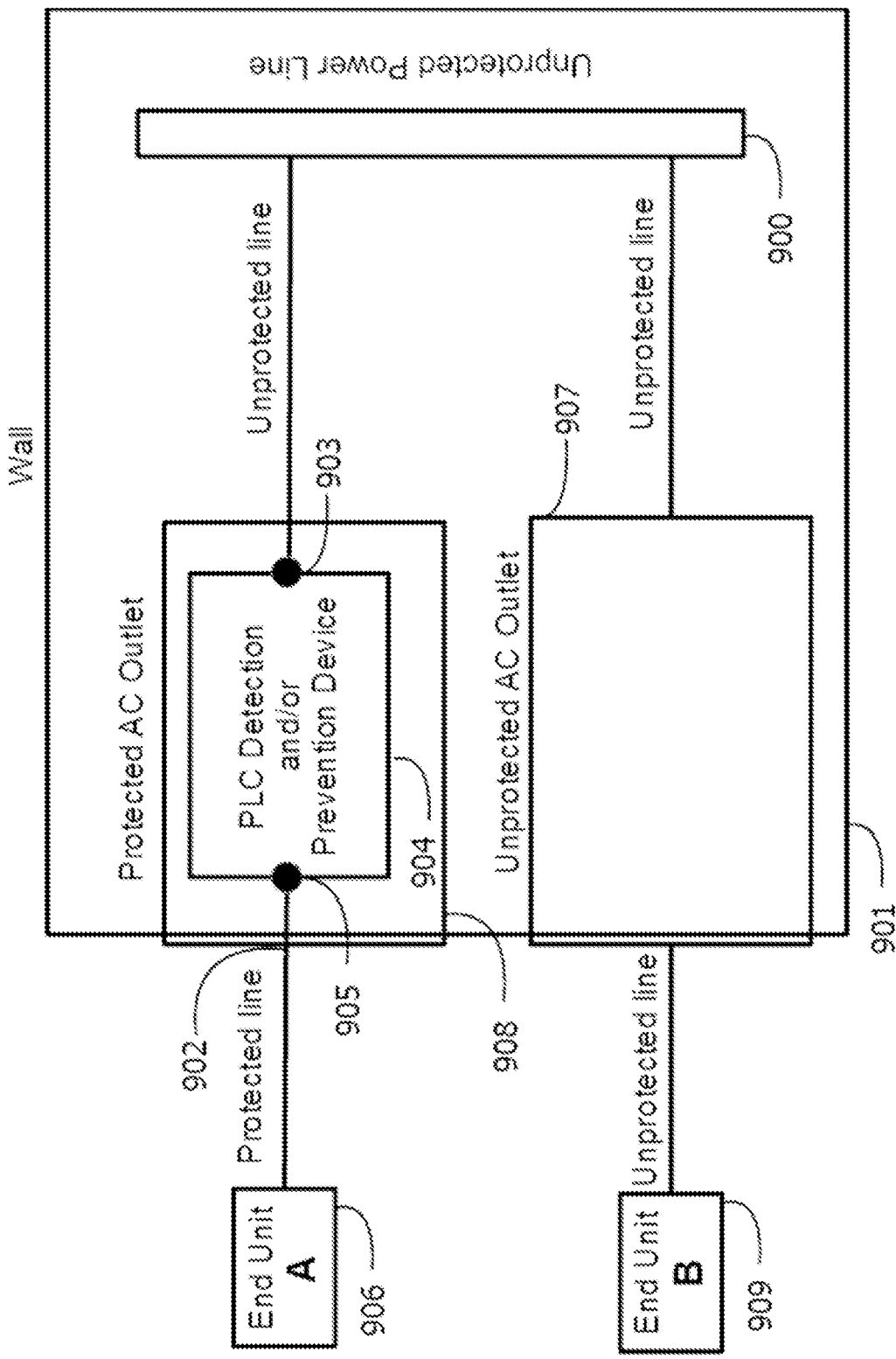
FIG. 9. A block diagram of a system for power line communication prevention, and/or detection, the system includes a device for prevention and/or detection of power line communication, embedded in the wall's protected outlets, according to some embodiments.

Reference is made to FIG. 9, which illustrates a block diagram of a system for power line communication prevention, and/or detection, the system includes a device for prevention and/or detection of power line communication, embedded in the wall's protected outlets, according to some embodiments. As shown in FIG. 9, a device for prevention and/or detection of power line communication (904), is embedded in the wall's (901) protected outlets (908). The unprotected side of the device (903) is connected to the unprotected power line (900) inside the wall (901) and the protected side of the device (905) is connected to the protected outlet's output connection (902). As a result, end unit A (906) is protected against communication over powerline, for example, from end unit B (909), connected to unprotected A/C outlet (907).

Figure 10:
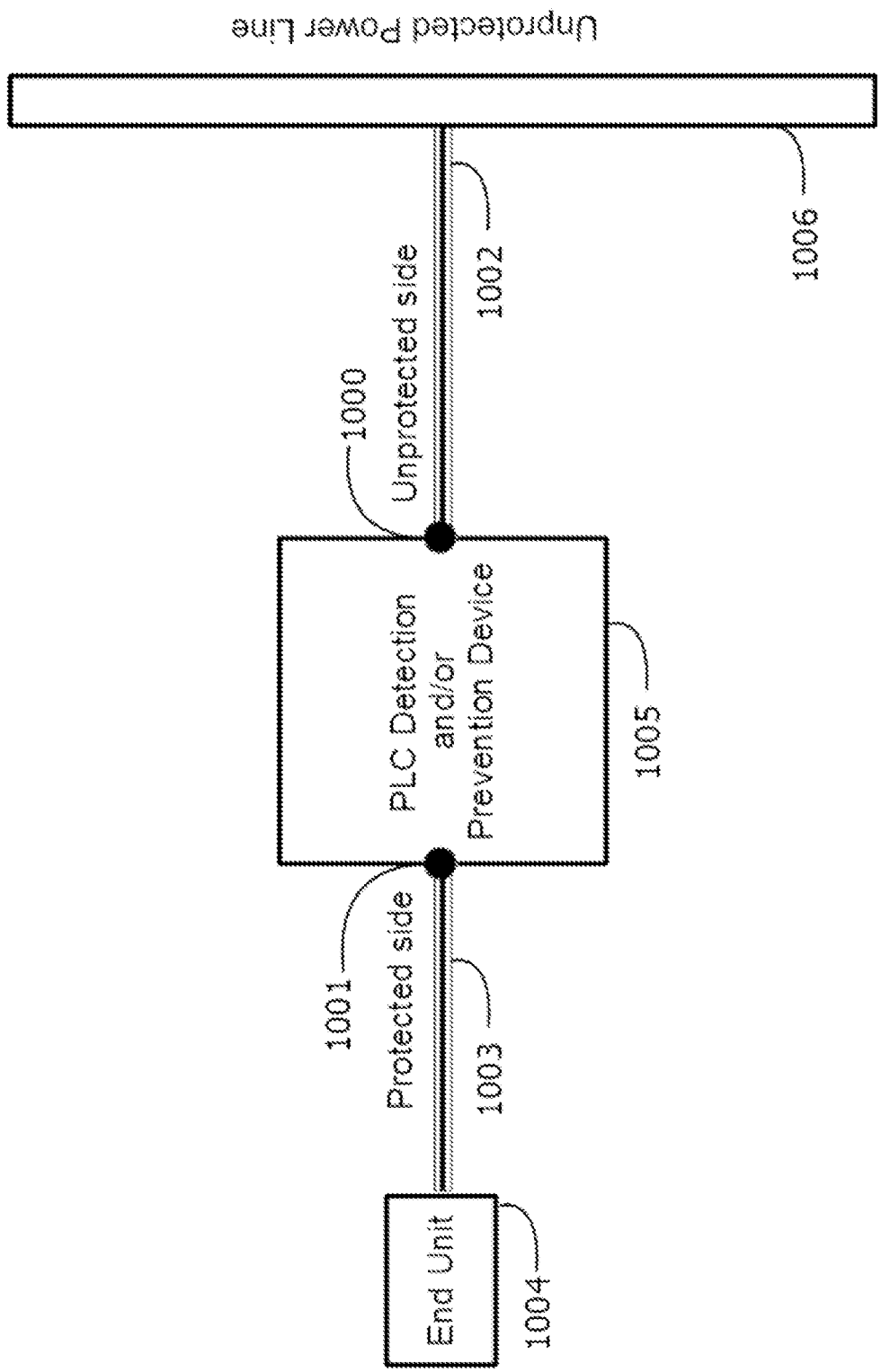
FIG. 10. A block diagram of a system for power line communication prevention, and/or detection, the system includes a device for prevention and/or detection of power line communication and shielded input and output cables, according to some embodiments.

Reference is made to FIG. 10, which illustrates a block diagram of a system for power line communication prevention, and/or detection, the system includes a device for prevention and/or detection of power line communication and shielded input and output cables, according to some embodiments. As shown in FIG. 10, the unprotected side (1000) of a stand-alone device for prevention and/or detection of power line communication (1005), is connected to the unprotected power line (1006) via external shielded cable (1002) and the protected side of the device (1001), is connected to the end unit (1004) via an external shielded cable (1003). As a result, the end unit (1004) is protected against communication over power line. In some embodiments, the casing of the device can be shielded or unshielded and it can be made, for example, from metal, plastic, and the like. In some embodiments, the device may be portable device.

In some embodiments, the end unit can be for example, an electric appliance, a personal computer (PC), a printer, a scanner, or any other unit connected to the mains.

While the present invention has been described with reference to certain embodiments, it will be understood by those skilled in the art, that various changes may be made and equivalents may be substituted without departing from the scope of the present invention. In addition, many modifications may be made to adapt a particular situation or material to the teachings of the present invention without departing from its scope. Therefore, it is intended that the present invention not to be limited to the particular embodiments disclosed, but that the present invention will include all embodiments falling within the scope of the appended claims.

The following examples are presented to provide a more complete understanding of the invention. The specific techniques, conditions, materials, proportions and reported data set forth to illustrate the principles of the invention are exemplary and should not be constructed as limiting the scope of the invention.

EXAMPLES

Example 1—Narrowband Power Line Communication

The device for PLC prevention and/or detection used in this example includes the following elements: dual port PLC signal detector, two PLC filters, PLC noise generator and power supply with zero-cross (Z.C) indication. The operation frequency range of the device is 40 KHz-30 MHz, other parameters and methods of operation of each element are detailed in Table 1.

TABLE 1

| Element | Method | Value |
| --- | --- | --- |
| Unprotected side filter | Attenuation | At least 40 dB across the operation frequency range |
| Protected side filter | Attenuation | At least 20 dB across the operation frequency range |
| Noise generator | AWGN | ~2 Vrms |
| Signal detector's unprotected side port | RSSI | ~1 Vrms |
| Signal detector's protected side port | RSSI | ~0.1 Vrms |

In this example the device is tested for prevention of data transfer from end unit A connected at the protected side to end unit B connected to the unprotected side and vice versa, using PLC narrow band PRIME technology on channel 1 (~42 KHz-88 KHz).

The first test includes sending data from end unit A to end unit B using PRIME technology. When the signal level at the protected side of the device is over 0.1 Vrms the PLC signal detector connected to the protected side sets an alarm and disconnect the power to end unit A, when the signal level is under 0.1 Vrms it is not detected by the detector and the signal goes through the filter on the protected side which attenuates the signal by 20 dB to a level of 0.01 Vrms. At this point a 2 Vrms AWGN interference is injected to the line resulting in a signal to noise ratio (SNR) of −18 dB, according to the following formula:

$$BW \text{ Ratio} = 10 \log\left(\frac{\text{Signal } BW}{\text{Noise } BW}\right) = 10 \log\left(\frac{46K}{30M}\right) = -28 \text{ dB}$$

-continued $$SNR[dB] = 20\log\left(\frac{\text{Signal Level}}{\text{Noise Level}}\right) - BW \text{ Ratio} = 20\log\left(\frac{0.01}{2}\right) + 28 = -18 \text{ dB}$$

The signal and noise are further attenuated by 40 dB as they go through the filter at the unprotected side, resulting a signal level of 0.0001 Vrms at the unprotected side and SNR of not more than −18 dB, under these conditions the communication over power line using PRIME technology failed.

The second test includes sending data from end unit B to end unit A using PRIME technology. When the signal level at the unprotected side of the device is over 1 Vrms the PLC signal detector connected to the unprotected side sets an alarm and disconnect the power to end unit A, when the signal level is under 1 Vrms it is not detected by the detector and the signal goes through the filter on the unprotected side which attenuates the signal by 40 dB to a level of 0.01 Vrms. At this point a 2 Vrms AWGN interference is injected to the line resulting in a signal to noise ratio (SNR) of −18 dB, according to the following formula:

$$BW \text{ Ratio} = 10\log\left(\frac{\text{Signal } BW}{\text{Noise } BW}\right) = 10\log\left(\frac{46K}{30M}\right) = -28 \text{ dB}$$

$$SNR[dB] = 20\log\left(\frac{\text{Signal Level}}{\text{Noise Level}}\right) - BW \text{ Ratio} = 20\log\left(\frac{0.01}{2}\right) + 28 = -18 \text{ dB}$$

The signal and noise are further attenuated by 20 dB as they go through the filter at the unprotected side, resulting a signal level of 0.001 Vrms at the unprotected side and SNR of not more than −18 dB, under these conditions the communication over power line using PRIME technology failed.

Conclusion:

The device is capable of preventing communication over power line using narrowband PRIME technology between end unit A (connected at the protected side) and end unit B (connected at the unprotected side).

Example 2—Broadband Power Line Communication

The device for PLC prevention and/or detection used in this Example includes the following elements: dual port PLC signal detector, two PLC filters, PLC noise generator and power supply with zero-cross (Z.C) indication. The operation frequency range of the device is 40 KHz-30 MHz, other parameters and methods of operation of each element are detailed in Table 2.

TABLE 2

| Element | Method | Value |
|---|---|---|
| Unprotected side filter | Attenuation | At least 40 dB across the operation frequency range |
| Protected side filter | Attenuation | At least 20 dB across the operation frequency range |
| Noise generator | AWGN | ~2 Vrms |
| Signal detector's unprotected side port | RSSI | ~1 Vrms |
| Signal detector's protected side port | RSSI | ~0.1 Vrms |

In this example, the device is tested for prevention of data transfer from end unit A connected at the protected side to end unit B connected to the unprotected side and vice versa, using PLC broad band HPGP technology (~2 MHz-28 MHz).

The first test includes sending data from end unit A to end unit B using HPGP technology. When the signal level at the protected side of the device is over 0.1 Vrms the PLC signal detector connected to the protected side sets an alarm and disconnect the power to end unit A, when the signal level is under 0.1 Vrms it is not detected by the detector and the signal goes through the filter on the protected side which attenuates the signal by 20 dB to a level of 0.01 Vrms. At this point a 2 Vrms AWGN interference is injected to the line resulting in a signal to noise ratio (SNR) of −45.4 dB, according to the following formula:

$$BW \text{ Ratio} = 10\log\left(\frac{\text{Signal } BW}{\text{Noise } BW}\right) = 10\log\left(\frac{26K}{30M}\right) = -0.6 \text{ dB}$$

$$SNR[dB] = 20\log\left(\frac{\text{Signal Level}}{\text{Noise Level}}\right) - BW \text{ Ratio} = 20\log\left(\frac{0.01}{2}\right) + 0.6 = -45.4 \text{ dB}$$

The signal and noise are further attenuated by 40 dB as they go through the filter at the unprotected side, resulting a signal level of 0.0001 Vrms at the unprotected side and SNR of not more than −45.4 dB, under these conditions the communication over power line using HPGP technology failed.

The second test includes sending data from end unit B to end unit A using HPGP technology. When the signal level at the unprotected side of the device is over 1 Vrms the PLC signal detector connected to the unprotected side sets an alarm and disconnect the power to end unit A, when the signal level is under 1 Vrms it is not detected by the detector and the signal goes through the filter on the unprotected side which attenuates the signal by 40 dB to a level of 0.01 Vrms. At this point a 2 Vrms AWGN interference is injected to the line resulting in a signal to noise ratio (SNR) of −45.4 dB, according to the following formula:

$$BW \text{ Ratio} = 10\log\left(\frac{\text{Signal } BW}{\text{Noise } BW}\right) = 10\log\left(\frac{26K}{30M}\right) = -0.6 \text{ dB}$$

$$SNR[dB] = 20\log\left(\frac{\text{Signal Level}}{\text{Noise Level}}\right) - BW \text{ Ratio} = 20\log\left(\frac{0.01}{2}\right) + 0.6 = -45.4 \text{ dB}$$

The signal and noise are further attenuated by 20 dB as they go through the filter at the unprotected side, resulting a signal level of 0.001 Vrms at the unprotected side and SNR of not more than −45.4 dB, under these conditions the communication over power line using HPGP technology failed.

Conclusion:

The device is capable of preventing communication over power line using broadband HPGP technology between end unit A (connected at the protected side) and end unit B (connected at the unprotected side).

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

The invention claimed is:

1. A device for prevention of power line communication (PLC), between an unprotected side and a protected side, the device comprising:
   a PLC detector configured to identify the presence of any type of PLC transmission, at the protected side and/or the unprotected side;
   a power supply;
   at least one PLC filter, configured to attenuate any type of PLC signal from the unprotected side to the protected side and vice versa; and
   a dedicated PLC noise generator, configured to generate noise at a frequency range of about 3 KHz-100 MHz, and to add the generated noise to the powerline, after the PLC signal has been attenuated by the PLC filter;
   wherein the device is configured to specifically prevent communication over power line, between the unprotected side and the protected side.

2. The device according to claim 1, wherein the frequency range of the PLC detector is about 3 KHz-100 MHz, or wherein the frequency range of the PLC detector is about 40 KHz-30 MHz.

3. The device according to claim 1, wherein the PLC detector is a dual port detector.

4. The device according to claim 1, wherein the frequency range of the PLC filter is about 3 KHz-100 MHz, or wherein the frequency range of the PLC filter is about 40 KHz- 30 MHz.

5. The device according to claim 1, comprising at least two PLC filters.

6. The device according to claim 5, comprising a first filter at the unprotected side of the device and a second filter at the protected side of the device.

7. The device according to claim 6, wherein an attenuation level of the first filter at the unprotected side is different than an attenuation level of the second filter at the protected side.

8. The device according to claim 1, wherein the frequency range of the noise generator is about 40 KHz-30 MHz.

9. The device according to claim 1, wherein the noise generator is a dual port noise generator.

10. The device according to claim 1, wherein the power supply provides zero-cross indication.

11. A method for prevention of power line communication (PLC), between an unprotected side and a protected side, the method comprising:
    detecting PLC, using a PLC detector, at the protected side and/or the unprotected side;
    filtering PLC, using one or more PLC filters, configured to attenuate any type of PLC signal, wherein the filtering is performed from the unprotected side to the protected side and vice versa; and
    generating, using a PLC noise generator, PLC noise at a frequency range of about 3 KHz- 100 MHz, and adding the generated noise to the powerline, after the PLC signal has been attenuated by the PLC filter.

12. The method according to claim 11, wherein the PLC detecting is performed by Received Signal Strength Indication (RSSI), cross correlation, pattern recognition, neural networks, or any combination thereof.

13. The method according to claim 12, wherein the type of the generated noise is selected from: additive white gaussian noise (AWGN), frequency hopping noise, random noise, or any combination thereof.

14. The method according to claim 11, wherein the noise is generated at more than one port.

15. The method according to claim 11, wherein the PLC detecting comprises detecting at two ports, a first port at the protected side and a second port at the unprotected side.

16. A system for prevention of power line communication (PLC), between an unprotected side and a protected side, the system comprising:
    an end unit; and
    a device for prevention of power line communication (PLC), between an unprotected side and a protected side, said device comprises:
    a PLC detector configured to identify the presence of any type of PLC transmission, at the protected side and/or the unprotected side;
    at least one PLC filter configured to attenuate any type of PLC signal from the unprotected side to the protected side and vice versa; and
    a dedicated PLC noise generator configured to generate noise at a frequency range of about 3 KHz-100 MHz, and to add the generated noise to the powerline, after the PLC signal has been attenuated by the PLC filter.

17. The system according to claim 16, wherein the end unit is selected from an electronic appliance, a personal computer, a printer, a scanner, or any unit connected to the mains.

18. The system according to claim 16, wherein the device is embedded within the end unit.

19. The system according to claim 16, wherein the device is embedded within wall's outlet(s).

20. The system according to claim 16, wherein the device is a stand-alone device connected to shielded or unshielded cables.

* * * * *